US010642506B2

(12) United States Patent
Bikumala et al.

(10) Patent No.: US 10,642,506 B2
(45) Date of Patent: May 5, 2020

(54) HIGH AVAILABILITY TRANSACTIONAL REPLICATION (71) Applicant: Dell Products L. P., Round Rock, TX (US)

(72) Inventors: Sathish Kumar Bikumala, Round Rock, TX (US); Nataraj Rachakonda, Austin, TX (US); Chandra Sekhar Uppuluri, Austin, TX (US)

(73) Assignee: Dell Products L. P., Round Rock, TX (US)

( * ) Notice: Subject to any disclaimer, the term of this patent is extended or adjusted under 35 U.S.C. 154(b) by 232 days.

(21) Appl. No.: 15/699,036

(22) Filed: Sep. 8, 2017

(65) Prior Publication Data
US 2019/0079682 A1  Mar. 14, 2019

(51) Int. Cl.
*G06F 11/00* (2006.01)
*G06F 3/06* (2006.01)
*G06F 11/14* (2006.01)
*G06F 16/27* (2019.01)
*G06F 11/20* (2006.01)

(52) U.S. Cl.
CPC ........ *G06F 3/0617* (2013.01); *G06F 11/1451* (2013.01); *G06F 11/1466* (2013.01); *G06F 11/2023* (2013.01); *G06F 11/2097* (2013.01); *G06F 16/27* (2019.01); *G06F 11/2038* (2013.01); *G06F 11/2048* (2013.01); *G06F 2201/80* (2013.01)

(58) Field of Classification Search
CPC .................................................... G06F 3/0617
See application file for complete search history.

(56) References Cited

U.S. PATENT DOCUMENTS

| | | | |
|---|---|---|---|
| 2002/0112196 A1* | 8/2002 | Datta | H04L 41/042 714/4.11 |
| 2011/0106972 A1* | 5/2011 | Grube | G06F 13/1668 709/238 |
| 2012/0110372 A1* | 5/2012 | Borgendale | G06F 9/546 714/4.11 |
| 2018/0096068 A1* | 4/2018 | Venkataramanappa | G06F 16/2379 |

* cited by examiner

*Primary Examiner* — Bryce P Bonzo
*Assistant Examiner* — Katherine Lin
(74) *Attorney, Agent, or Firm* — Campbell Stephenson LLP; Shiv S. Naimpally (57) ABSTRACT

Some examples include instructions stored in a memory and executed by one or more processors to configure an availability group that includes a primary database and a secondary database and configure one or more subscriptions associated with the primary database. Individual subscriptions of the one or more subscriptions may identify a network element (e.g., individual subscriber) of one or more network elements that subscribe to receiving a portion of data stored in the primary database. The processors may configure the secondary database to replicate a content of the primary database, configure the secondary database to publish data based on the one or more subscriptions in response to a failover from the primary database to the secondary database, and redirect the one or more subscriptions from the primary database to the availability group.

20 Claims, 4 Drawing Sheets

HIGH AVAILABILITY TRANSACTIONAL REPLICATION

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A primary database may receive data from upstream applications (e.g., pricing, discounts, Product Data, orders, quotes and the like). A mirror service may replicate the data stored on the primary database to a secondary (e.g., backup) database. When a problem is detected with the primary database, the system may failover to the secondary database. In a conventional system, the failover process may result in at least 72 hours of database downtime, during which live applications are manually switched over to use the secondary database. Because the upstream data feeds were being sent to the primary database, the secondary database may be out of sync with the data being sent by the upstream applications. If the primary database supports ecommerce applications that display products and services for purchase by consumers, enterprise customers, and the like, a long downtime may result in the loss of revenue. In addition, the data from the upstream applications may get backed up for 72+ hours such that when the databases are back up, the sudden flow of the backlogged data may cause performance bottlenecks. Furthermore, during the failover, the database servers may undergo multiple restarts which may lead to broken transactions and data-replication issues. If there are resource constraints, such as out of memory or lack of disk space, database corruption may occur, requiring that the database be restored and/or rebuilt from scratch. This activity could add up to 7+ days of downtime and unwanted/unplanned cost.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques are described to configure an availability group that includes a primary database and a secondary database and configure one or more subscriptions to receive data from the availability group. Individual subscriptions of the one or more subscriptions may identify a subscriber that receives a portion of data stored in the primary and in a distributor database. The systems and techniques may configure the secondary database to replicate a content of the primary database and configure the secondary database to publish data based on the one or more subscriptions in response to a failover from the primary database to the secondary database.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may create availability group and availability group listeners (AGL) and include configuration information, such as information identifying a primary database and a secondary database, in metadata. When the network components dedicated to data replication are unable to connect to the primary database (e.g., even after retrial attempts), the systems and techniques may setup a database called a replication distributor that determines (e.g., using the metadata) the secondary database associated with the primary database, establishes a connection with the secondary database, and re-routes data to the secondary database while maintaining the ACID (atomicity, consistency, isolation, durability) of the data being sent to the database. For example, in some cases, multiple databases may be configured to automatically (e.g., without human interaction) failover from the primary database to the secondary database such that the downstream subscribers continue to receive data to which they have subscribed with no (or minimal) interruption to the data subscriptions. Information, such as pointers to the secondary database, connection settings, metadata, connection retrial information, and other continuity info may be stored in a database called the replication distributor. ACID for the data is maintained as the replication distributor is aware of in-transit transactions before a failover occurs. In addition to detecting system faults, initiating automatic failover, and minimizing downtime during the failover, the systems and techniques described herein may automatically detect and correct system issues, such as, for example, a broken (e.g., unresponsive, corrupt, or the line) database, network paths, domain name server (DNS) corruption, physical database server issues (e.g., applications are unable to interact with a database due to a primary database server being unavailable even though the database server appears to be healthy and available), and the like.

The systems and techniques may (1) configure the database publications and database subscriptions, (2) configure an Always On availability group, (3) determine that secondary replica hosts are configured for replication, (4) configure secondary replica hosts as replication publishers, (5) redirect each original publisher to an Availability Group Listener (AGL) name, (6) execute a validation procedure to verify the configuration, and (7) add each original publisher, and secondary database (e.g., replica of the primary) to a replication monitor. In some cases (1) may be performed before (2), while in other cases (2) may be performed before (1).

Publisher redirection may be achieved by providing a replication agent with access to a publishing database by configuring a redirected publisher's entries in the replication distributor. The redirected publisher's entries may use an AGL name (rather than a specific publisher server name, a specific physical network name, a specific database name, or the like) to connect to the publisher and to the publishing database. When the replication agent restarts after failover, the connection is automatically redirected to the new primary (e.g., previously the secondary) because the connections to the publisher and to the publishing database are established through the AGL name.

One or more distributed replication agents may be deployed in the system. For example, log reader agents, snapshot agents, distribution agents, and merge agents may query the replication distributor to determine the redirected (e.g., new) publisher after a failover. If a redirected publisher was specified, then the AGL name may be used by the agents to connect to the database publisher. The systems and techniques may be used with a variety of database technologies, including, for example, structured query language (SQL) Server, Azure® SQL Database, Azure® SQL Data Warehouse, and Parallel Data Warehouse.

Figure 1:
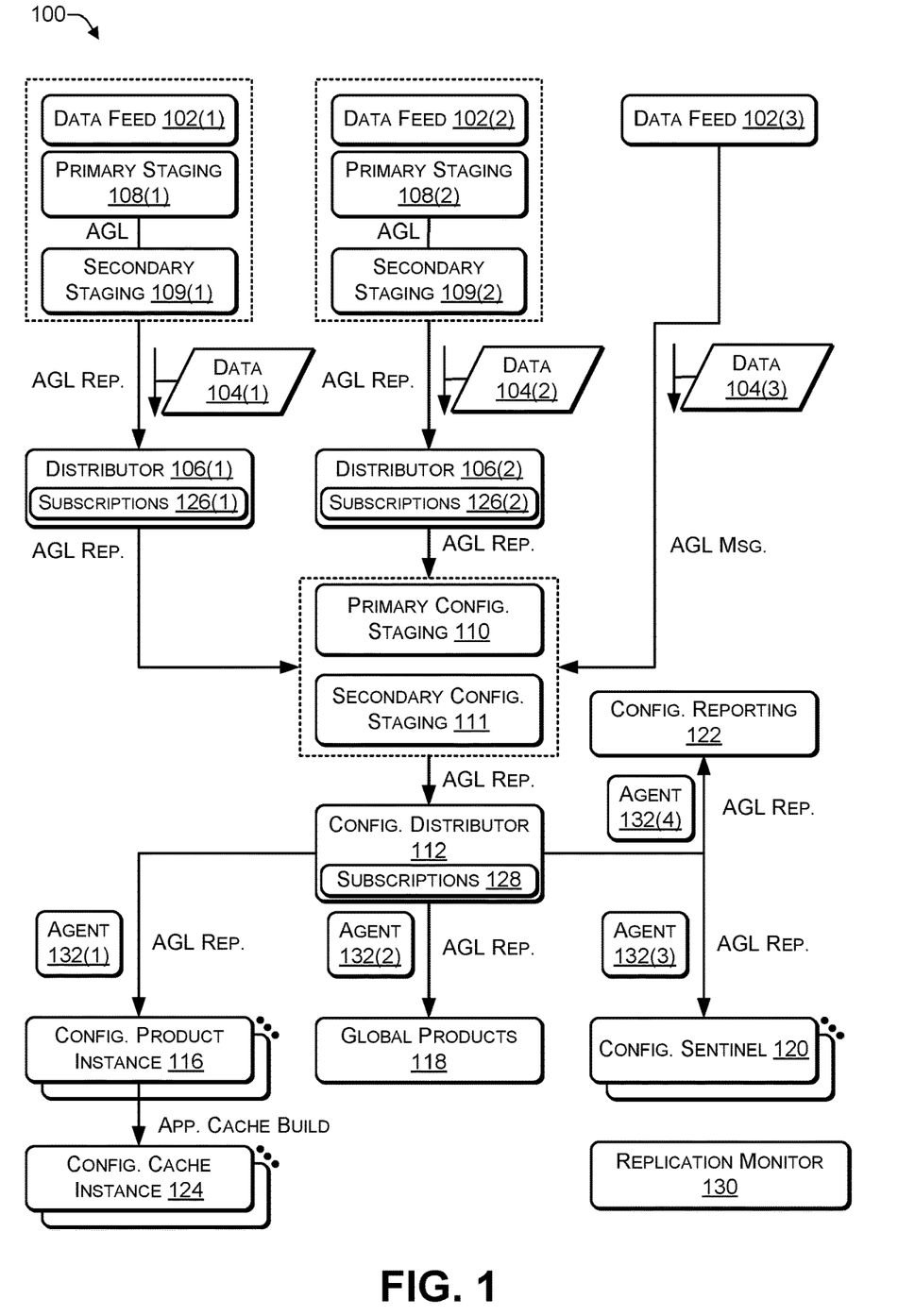
FIG. 1 is a block diagram illustrating an architecture that includes multiple databases according to some examples.

FIG. 1 is a block diagram illustrating an architecture 100 that includes multiple databases according to some examples. One or more data sources, such as data feeds 102(1), 102(2), and 102(3), may send data (e.g., data 104(1), 104(2), and 104(3), respectively) to downstream subscribers (e.g., network elements). In some cases, at least some of the data 104 may be sent to a distributor for distribution to the downstream subscribers while in other cases at least some of the data 104 may be sent as a message. For example, as illustrated in FIG. 1, the data 104(1) and 104(2) may be sent to the distributors 106(1) and 106(2), respectively, for distribution to the downstream subscribers. The distributor 106(1) may send the data 104(1) to downstream subscribers according to subscriptions 126(1). The distributor 106(2) may send the data 104(2) to downstream subscribers according to subscriptions 126(2). The subscriptions 126(1), 126(2) may identify an address (e.g., Internet Protocol (IP) address or other type of address) of each subscriber and the types of data (e.g., which fields in a database) each subscriber is to be sent. In some cases, some data feeds, such as the data feed 102(3), may send the data 104(3) via a messaging system, such as, for example, AGL Microsoft® Message Queuing (MSMQ) or other similar messaging system.

The data feed 102(1) may provide the data 104(1) from the availability group that includes staging databases (e.g., publishers) 108(1), 109(1). For example, the staging databases 108(1), 109(1) may be used to host an ecommerce website for consumers to view details associated with multiple items (e.g., products and services) and to submit orders for one or more items. The staging databases may include the primary staging database 108(1) and at least one secondary (e.g., replica) staging database 109(1). AGL may be configured for the primary staging database 108(1) and the secondary staging database 109(1). If a problem is detected with the primary staging database 108(1), the architecture 100 may failover to the secondary staging database 109(1).

The data feed 102(2) may provide the data 104(2) from an availability group that includes staging databases (e.g., publishers) 108(2), 109(2). For example, staging databases 108(2), 109(2) may be used as an ecommerce website for enterprise customers to view details associated with multiple items (e.g., products and services) and to submit orders for one or more items. The availability group may include at least the primary staging database 108(2) and the secondary staging database 109(2) (e.g., the secondary database is replica of the primary database and may be used for data recovery if something happens to the primary database). AGL may be configured for the primary staging database 108(2) and for the secondary staging database 109(2). If a problem is detected with the primary staging database 108(2), the architecture 100 may failover to the secondary staging database 109(2).

The data feed 102(3) may include information about various items offered for purchase via the staging databases (e.g., publishers) 108(1), 109(1) (e.g., consumer items) and via the staging databases 108(2), 109(2) (e.g., enterprise-related items). In some cases, the data feed 102(3) may be from a legacy system. For this reason, in some cases, the data 104(3) may be sent to configuration staging 110 using messaging.

The distributors 106(1) and 106(2) may receive the data 104(1) and 104(2) based on AGL replication. Configuration staging 110, 111 may receive the data 104(1) and 104(2) from the distributors 106(1), 106(2) based on AGL replication. Configuration staging 110, 111 may receive the data 104(3) based on AGL messaging. Configuration staging 110, 111 may include a composite catalog of all items (e.g., products and services) offered by staging 108(1) (e.g., consumer items) and by staging 108(2) (e.g., enterprise-related items) along with details about the products provided by the data feed 102(3). An availability group may include at least the primary configuration staging database 110 and the secondary (e.g., backup) configuration staging database

111. AGL may be configured for the primary staging database 110 and the secondary staging database 111. If a problem is detected with the primary staging database 110, the architecture 100 may failover to the secondary staging database 111.

A configuration distributor 112 may receive the data 104 from the configuration staging 110 and distribute the data 104 to downstream subscribers (e.g., network elements), such as the one or more configuration product instances 116, global products 118, one or more configuration sentinels 120, and configuration reporting 122. The configuration distributor 112 may send data to downstream subscribers according to subscriptions 128. In some cases, the configuration product instances 116 may be used as staging areas for an ecommerce site prior to having a particular configuration product instance go "live". For example, an ecommerce site may have timed deals (e.g., including door busters), in which a particular item is offered at a promotional price for a particular period of time. To illustrate a first product may be offered at a promotional price from a first particular point in time (e.g., 09:00 AM Eastern) to a second particular point in time (e.g., 09:59 AM Eastern), a second product may be offered from 10:00 AM Eastern to 10:59 AM Eastern, and so on. Prior to enabling the purchase of the first product, the ecommerce website may be staged as a first of the configuration product instances 116. From 9:00 AM to 9:59 AM, the first configuration product instance 116 may be accessible to purchasers. At 10:00 AM, a second configuration product instance 116 may be accessible to purchasers and the first configuration product instance 116 may be inaccessible to purchasers, and so on. To enable a particular configuration product instance 116 to become accessible to purchasers, the website may be cached as a configuration cache instance 124.

In FIG. 1, each of the distributors 106(1), 106(2), and 112 may be distribution databases that receive data via AGL replication (labelled "AGL Rep.") and distribute the data using AGL replication. When a failover (e.g., from the primary to the secondary database) of the staging databases 108(1) or 108(2) occurs, the distributors 106(1), 106(2) seamlessly and automatically begins receiving data from the secondary database. When a failover (e.g., from the primary to the secondary database) of the config. staging database 110 occurs, the configuration distributor 112 seamlessly and automatically begins receiving data from the secondary database. Each of the staging databases 108(1), 108(2), 109(1), 109(2), 110, and 111 may be hosted by a different server that the other staging databases.

A replication monitor 130 may be connected (e.g., via a network) to the various components of the architecture 100. The replication monitor 130 may provide a graphical representation of the overall health of replication occurring in the architecture 100. For example, the replication monitor 130 may provide detailed information on the status of replication and performance of publications and subscriptions, allowing a user, such as a system administrator, to determine whether the replication system is healthy, which subscriptions are slow to receive data, how long will it take a transaction that is committed at a particular point in time to reach a subscriber, and the like.

Multiple agents, such as, for example, agents 132(1), 132(2), 132(3), and 132(4), may be deployed in the architecture 100 to perform various functions, such as tasks associated with replication, including creating copies of schema and data, detecting updates at a publisher or a subscriber, and propagating changes (e.g., from a first database to a second database). While four representative agents are shown in FIG. 1, additional agents may be present in the architecture 100. For example, a replication agent may be used to replicate the contents of a primary database (e.g., 108(1), 108(2), or 110) to a secondary database (e.g., 109(1), 109(2), or 111). The types of agents may include, for example, a snapshot agent, a distribution agent, a log reader agent, and a merge agent. A snapshot agent may prepare snapshot files that include schema and data of published tables and database objects, store the files in a snapshot folder, and record synchronization jobs in a distribution database. A distribution agent may move snapshot files and transactions held in distribution database tables (for transactional replication) to destination tables associated with subscribers. A log reader agent may monitor a transaction log of each database configured for transactional replication and copy the transactions marked for replication from the transaction log to a distributor (e.g., a distribution database). A merge agent may apply an initial snapshot held in a database to one or more subscribers and then merge incremental data changes that occurred at the publisher (e.g., publishing database) after the initial snapshot was created. The merge agent may reconcile conflicts (e.g., between the initial snapshot and the incremental data changes) according to a set of rules. For example, the rules may be configured by a system administrator or the like.

Thus, an AGL name may be created and a metadata configuration created with references to primary database and the corresponding secondary databases. When the connections dedicated to data replication are unable to connect to a primary database, even after retrial attempts, the replication distributors 106(1), 106(2), and 112 may identify the corresponding secondary database (e.g., associated with the primary database) and establish connections. Data flow may resume without losing the continuity or atomicity, consistency, isolation, durability (ACID) associated with the data and without human intervention. The pointers to the secondary database, along with other connection settings, metadata, connection retrial information, and other continuity information may be stored in databases called replication distributors, e.g., the distributors 106(1), 106(2), and 112. The databases 108(1), 108(2) and 110 may be multi-level database, with different levels (e.g., layers) of each database being distributed to downstream subscribers (e.g., network elements).

In addition to enabling seamless planned and unplanned failovers, the replication distributors 106(1), 106(2), and 112 may be able to deal with other system issues, such as broken network paths, database corruption, domain name server (DNS) corruption, physical database server issues (e.g., applications are unable to talk to a database though the server hosting the database appears healthy and available), and the like.

Figure 2:
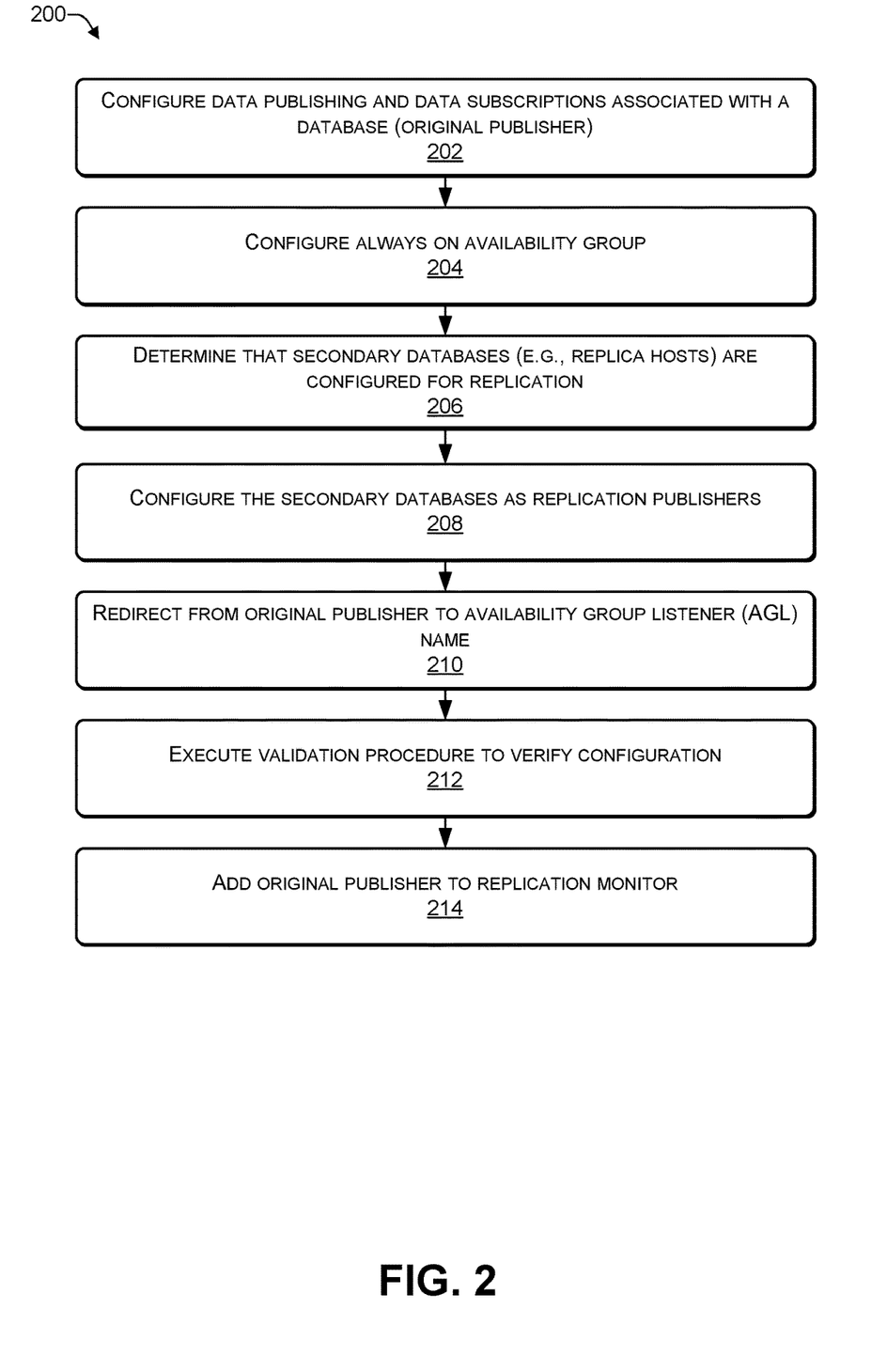
FIG. 2 is a flowchart of a process that includes configuring an always on availability group according to some examples.
Figure 3:
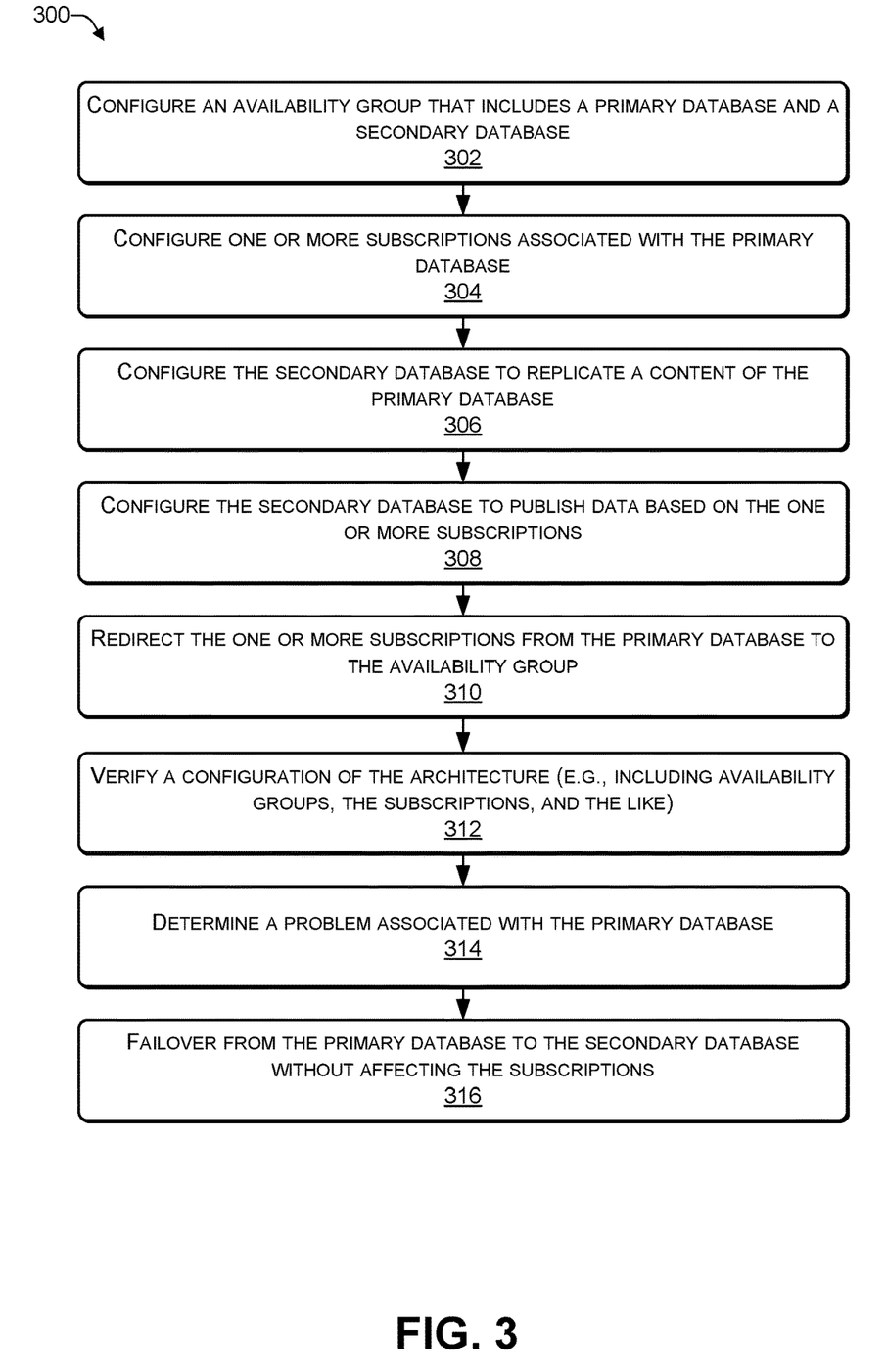
FIG. 3 is a flowchart of a process that includes configuring one or more subscriptions associated with a database according to some examples.

In the flow diagrams of FIGS. 2 and 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200 and 300 are described with reference to FIG. 1, as described above, although other models, frameworks, systems and environments may implement these processes.

FIG. 2 is a flowchart of a process 200 that includes configuring an always on availability group according to some examples. The process 200 may be performed by one or more components of FIG. 1.

At 202, the publications and subscriptions for each database (e.g., 108(1), 108(2), and 110 of FIG. 1) may be configured. For example, in FIG. 1, the data feed 102(1) may be published to the distributor 106(1) and the data feed 102(2) may be published to the distributor 106(2). As another example, the configuration staging 110 may subscribe to data 104(1) using the distributor 106(1) and subscribe to data 104(2) using the distributor 106(2).

At 204, an Always On availability group may be configured for each database. For example, a first availability group (with a corresponding first group name) may include the staging databases 108(1) and 109(1), a second availability group (with a corresponding second group name) may include the staging databases 108(2) and 109(2), and a third availability group (with a corresponding third group name) may include the configuration staging databases 110 and 111, At 206, secondary databases (e.g., replica hosts) may be configured for replication. For example, in FIG. 1, the secondary staging database 109(1) may be configured to replicate the primary staging database 108(1), the secondary staging database 109(2) may be configured to replicate the primary staging database 108(2), and the secondary configuration staging database 111 may be configured to replicate the primary configuration staging database 110. For example, one or more agents may be used to replicate the contents of a primary database to a secondary database.

At 208, the secondary databases (e.g., replica hosts) may be configured as replication publishers. For example, in FIG. 1, the secondary databases 109(1), 109(2), and 111, may be configured as publishers to subscribers. To illustrate, the secondary databases may configured to publish to subscribers in response to a particular event occurring, such as, for example, a failover occurring from the primary database to the secondary database.

At 210, an original publisher is reconfigured (e.g., redirected) to the Availability Group Listener (AGL) Name. For example, instead of using a particular name or address (e.g., internet protocol (IP) address) of a publisher, an AGL name is used instead. The AGL name may encompass both a primary database and a corresponding secondary database. The publishing is thus done with respect to the AGL name such that if a failover occurs from the primary database to the secondary database, the subscribers to the publisher, e.g., the AGL name, continue to remain subscribed.

At 212, a validation procedure may be executed to verify the configuration. For example, in FIG. 1, after the configuration of the availability groups, the configuration of the subscriptions, and the like, have been configured, the configuration may be verified by the distributor. For example, the configuration of the availability groups may be verified and a determination made that within each availability group, at least one secondary database is replicating contents of a primary database. The configuration of the subscriptions may be verified to determine that the subscriptions reference an availability group name and availability group (AGL) listener rather than a particular primary database.

At 214, the original publisher may be added to a replication monitor. For example, in FIG. 1, the primary databases 108(1), 108(2), and 110 may be added to the replication monitor 130 to enable the replication monitor to monitor and display a visual representation of the status of the databases publishing to downstream subscribers.

For publisher redirection, replication agents that access a publishing database may be configured with redirected publisher's entries that make use of an AGL name to connect to the publisher and to the publishing database. When a replication agent restarts after a failover (e.g., the secondary database rather than the primary database is active), the replication agent is automatically redirected to the secondary database because the connection is established using the AGL name, which includes the active database from among the primary database and the secondary database.

A log reader agent, a snapshot agent, and a merge agent may query the distribution database for a publisher after a failover and connect to the publisher using AGL.

Replication agents may be redirected using a command, such as "SP_REDIRECT_PUBLISHER", to redirect a publisher to a listener. A command, such as "SP_GET_REDIRECTED_PUBLISHER", may be executed by agents to check if a publisher/distributor has a redirected publisher and may be executed by a user with elevated privileges (e.g., sysadmin or db_owner). A command, such as "SP_VALIDATE_REDIRECTED_PUBLISHER", may be used to validate whether the current publisher is capable of hosting the published database and to verify if the current host for the published database is capable of supporting replication under an availability group. A command, such as SP_VALIDATE_REPLICATE_HOSTS_AS_PUBLISHERS, may be executed by user to validate a replication topology.

During the recovery process, a "Recreate Subscription" command may be used to create a new subscription with a new snapshot. A command, such as "Restore Data ACID" may be executed on publication, e.g., sp_changepublication@publication=N'<publication name>', @property=N'allow_initialize_from_backup'@value='true'.

After the subscribing database has failed over, the following command may be issued on the new primary replica and save the LSN value returned: SELECT Transaction_TimeStamp FROM <ReplicaDatabaseName>..MSreplication_subscriptions. A command, such as "EXEC sp_subscription_cleanup@Publisher='<PublisherServer>', @Publisher_DB='<PublishingDatabase>'" may be used to execute a subscription cleanup procedure.

After connecting to a publisher, the following command may be executed to add a new subscription:

exec sp_addsubscription@publication=N'AGL_DB',
@subscriber='AGLName', --Active Group Listener Name
@destination_db=N'SubscriberDB',
@subscription_type=N'Push',
@sync_type=N'automatic',
@article=N'all', @update_mode=N'read only', @subscriber_type=0
exec
sp_addpushsubscription_agent@publication=N'PublisherDB',
@subscriber=N'AGLNmae', --Active Group Listener Name
@subscriber_db=N'SubscriberDB',
@job_login=null, @job_password=null,
@subscriber_security_mode=1,
@subscriber_login=N'',
@subscriber_password='',
@frequency_type=64, @frequency_interval=0,
@frequency_relative_interval=0, @frequency_recurrence_factor=0, @frequency_subday=0,
@frequency_subday_interval=0, @active_start_time_of day=0,
@active_end_time_of day=235959, @active_start_date=20100406,
@active_end_date=99991231,
@enabled_for_syncmgr=N'False',
@dts_package_location=N'Distributor'
exec sp_addsubscription
@publication='<PublicationName>',
@subscriber=N'<NewReplicaServername>',
@destination_db='<ReplicaDatabaseName>',
@subscription_type=N'Push',
@sync_type=N'Initialize from LSN',
@Subscriptionlsn=<LSN from step 1>,
@article=N'all',
@update_mode=N'read only',
@subscriber_type=0

FIG. 3 is a flowchart of a process 300 that includes configuring one or more subscriptions associated with a database according to some examples. The process 300 may be performed by one or more components of FIG. 1.

At 302, an availability group that includes a primary database and a secondary database may be configured. For example, in FIG. 1, the databases 108(1), 109(1) may be configured as an always on availability group, the databases 108(2), 109(2) may be configured as an always on availability group, and the databases 110, 111 may be configured as an always on availability group.

At 304, one or more subscriptions associated with the primary database may be configured. For example, in FIG. 1, various downstream network elements may subscribe to portions of the data stored in each of the primary databases 108(1), 108(2), and 110. To illustrate, a subscription may specify that when one or more fields in the database are modified, the location(s) of the fields in the database and the modified (e.g., updated) value(s) may be sent to the subscribing entities.

At 306, the secondary database may be configured to replicate a content of the primary database. For example, in FIG. 1, the secondary staging database 109(1) may be configured to replicate the contents of the primary staging database 108(1), the secondary staging database 109(2) may be configured to replicate the contents of the primary staging database 108(2), and the secondary configuration database 110 may be configured to replicate the contents of the secondary configuration database 111.

At 308, the secondary database may be configured to publish data based on the one or more subscriptions. For example, in FIG. 1, the secondary staging database 109(1), the secondary staging database 109(2), and the secondary configuration database 110 may be configured to publish data to downstream subscribers based on one or more subscriptions.

At 310, the one or more subscriptions may be redirected (e.g., modified) from the primary database to the availability group to one or more downstream subscribers. For example, in FIG. 1, the one or more subscriptions associated with the downstream subscribers may be modified to reference an availability group, such as a first group that includes the primary staging database 108(1) and the secondary staging database 109(1), a second group that includes the primary staging database 108(2) and the secondary staging database 109(2), or a third group that includes the primary configuration staging database 110 and the secondary configuration staging database 111.

At 312, a configuration of the architecture, including the availability groups, the subscriptions, and the like, may be verified. For example, in FIG. 1, after the configuration of the availability groups, the configuration of the subscriptions, and the like, have been configured, the configuration may be verified. For example, the configuration of the availability groups may be verified and a determination made that within each availability group, at least one secondary database is replicating contents of a primary database. The configuration of the subscriptions may be verified to determine that the subscriptions reference an availability group name rather than a particular primary database.

At 314, a problem associated with the primary database may be identified. At 316, a failover from the primary database to the secondary database may occur without affecting the subscriptions of the downstream subscribers. For example, in response to detecting a problem with a primary database (e.g., one of the primary databases 108(1), 108(2), or 110), a determination may be made whether to perform a failover to the corresponding secondary database. For example, if the problem is relatively minor and the database can quickly and reliably recover from the problem, then a failover may not be performed. However, if the problem is such that the database is unlikely to recover in a timely manner from the problem, then a failover to the corresponding secondary database may be performed.

Figure 4:
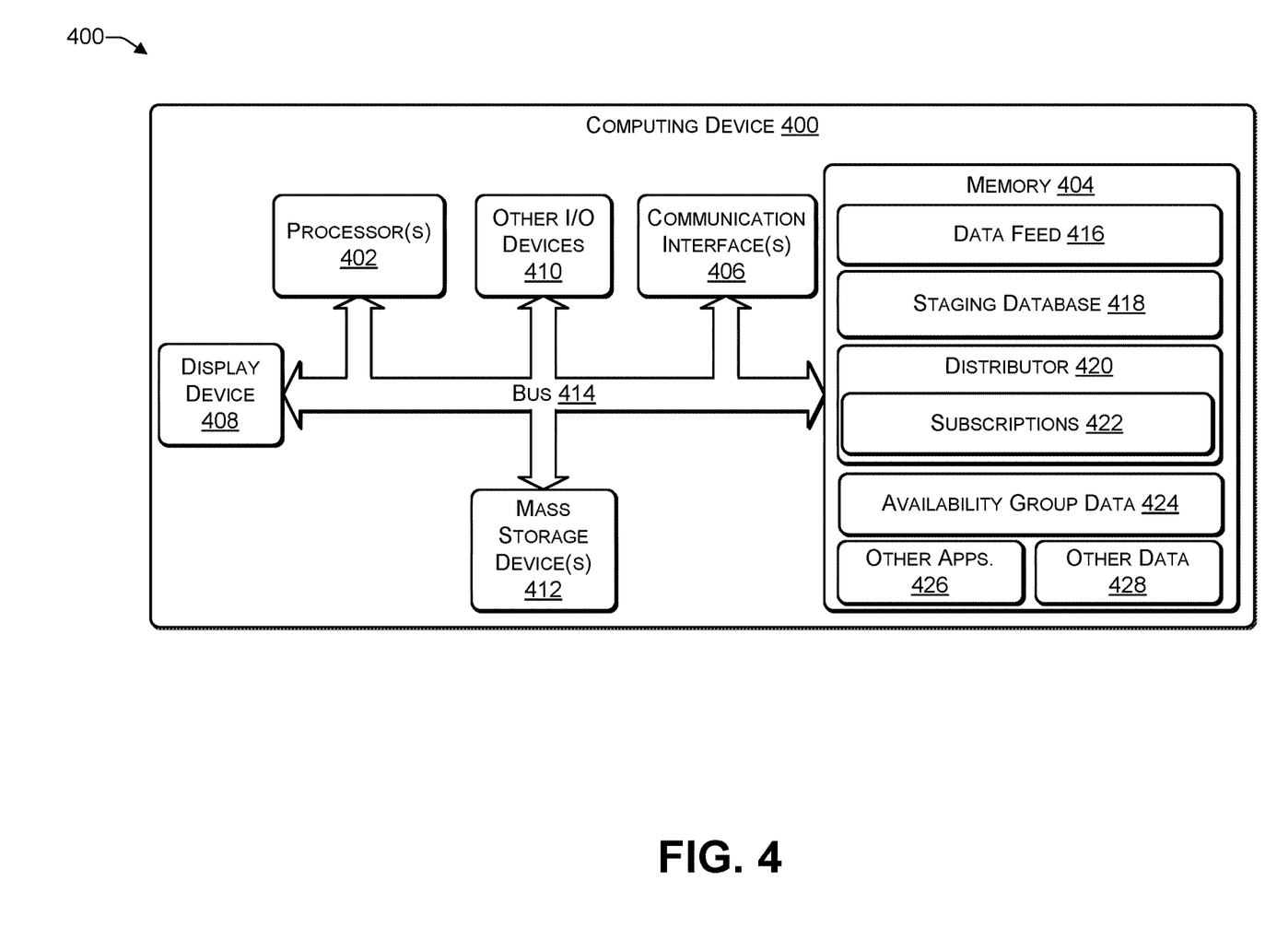
FIG. 4 illustrates an example configuration of a computing device that can be used to implement the systems and techniques described herein.

FIG. 4 illustrates an example configuration of a computing device 400 that can be used to implement the systems and techniques described herein, such as a corporate server to host the MLE 110. The corporate server may be located at the customer's premises or may be located at a remote site (e.g., cloud-based server). The computing device 400 may include one or more processors 402, a memory 404, communication interfaces 406, a display device 408, other input/output (I/O) devices 410, and one or more mass storage devices 412, configured to communicate with each other, such as via a system bus 414 or other suitable connection.

The processor 402 is a hardware device (e.g., an integrated circuit) that may include one or more processing units, at least some of which may include single or multiple computing units or multiple cores. The processor 402 can be implemented as one or more hardware devices, such as microprocessors, microcomputers, microcontrollers, digital signal processors, central processing units, state machines, logic circuitries, and/or any devices that manipulate signals based on executing operational instructions. Among other capabilities, the processor 402 can be configured to fetch and execute computer-readable instructions stored in the memory 404, mass storage devices 412, or other computer-readable media.

Memory 404 and mass storage devices 412 are examples of computer storage media (e.g., memory storage devices) for storing instructions which are executed by the processor 402 to perform the various functions described above. For example, memory 404 may generally include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein, and may be a media capable of storing computer-readable, processor-executable program instructions as computer program code that can be executed by the processor 402 as a particular machine configured for carrying out the operations and functions described in the implementations herein.

The computing device 400 may also include one or more communication interfaces 406 for exchanging data with other computing devices. The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like. Communication interfaces 406 can also provide communication with external storage (not shown), such as in a storage array, network attached storage, storage area network, or the like.

A display device 408, such as a monitor may be included in some implementations for displaying information and images to users. Other I/O devices 410 may be devices that receive various inputs from a user and provide various outputs to the user, and may include a keyboard, a remote controller, a mouse, a printer, audio input/output devices, and so forth.

The computer storage media, such as memory 404 and mass storage devices 412, may be used to store software and data. For example, the computer storage media may be used to store at least one data feed 416 (e.g., one of the data feeds 102(1), 102(2), or 102(3) of FIG. 1), two or more staging databases 418(1) to 418(N), at least one replication distributor 420 (e.g., one of the distributors 106(1), 106(2), or 112 of FIG. 1), one or more subscriptions 422 (e.g., associated with downstream subscribers), one or more availability group data 424 (e.g., including availability group names, addresses of members of each availability group, and the like), other applications 426, and other data 424. The staging databases 418 may include a primary staging database (e.g., one of the databases 108(1), 108(2), or 110 of FIG. 1) and one or more secondary staging databases (e.g., one of the databases 109(1), 109(2), or 111 of FIG. 1).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, and can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various examples of the method and apparatus of the present disclosure have been illustrated herein in the Drawings and described in the Detailed Description, it will be understood that the disclosure is not limited to the examples disclosed, and is capable of numerous rearrangements, modifications and substitutions without departing from the scope of the present disclosure.

What is claimed is:

1. A computer-implemented method, comprising:
configuring an availability group that includes metadata identifying a primary database and a secondary database of the availability group;
configuring one or more subscriptions associated with the primary database, each subscription of the one or more subscriptions identifying a network element of one or more network elements that subscribes to a portion of data stored in the primary database;
configuring the secondary database to replicate a content of the primary database; and
configuring, based on the one or more subscriptions, the one or more network elements as listeners to the availability group including modifying each subscription of the one or more subscriptions to include information associated with the availability group rather than the primary database, wherein in response to a failover from the primary database to the secondary database, the secondary database publishes data to the listeners of the availability group.

2. The computer-implemented method of claim 1, further comprising:
verifying that, in response to the failover from the primary database to the secondary database, the secondary database publishes the data based on the one or more subscriptions to one or more network elements that were, prior to the failover, receiving the data from the primary database.

3. The computer-implemented method of claim 1, further comprising:
   determining a problem with the primary database;
   determining that the problem satisfies a failover threshold; and
   performing the failover from the primary database to the secondary database.

4. The computer-implemented method of claim 1, wherein, after performing the failover, the secondary database publishes the data, based on the one or more subscriptions, to the one or more network elements that were, prior to the failover, receiving the data from the primary database.

5. The computer-implemented method of claim 1, further comprising:
   determining that the failover from the primary database to the secondary database occurred; and
   maintaining an atomicity, consistency, isolation, durability of the data being sent to the listeners to the availability group.

6. The computer-implemented method of claim 1, wherein the secondary database is configured as a listener to the primary database.

7. The computer-implemented method of claim 1, wherein:
   the data is sent from the availability group to a distributor; and
   the distributor forwards the data, based on the one or more subscriptions, to the network elements.

8. One or more non-transitory computer-readable media storing instructions that are executable by one or more processors to perform operations comprising:
   configuring, by a distributor, an availability group that includes metadata identifying a primary database and a secondary database of the availability group;
   configuring, by the distributor, one or more subscriptions associated with the primary database, each subscription of the one or more subscriptions identifying a network element of one or more network elements that subscribes to a portion of data stored in the primary database;
   configuring, by the distributor, the secondary database to replicate a content of the primary database; and
   configuring, based on the one or more subscriptions, the one or more network elements as listeners to the availability group including modifying each subscription of the one or more subscriptions to include information associated with the availability group rather than the primary database, wherein in response to a failover from the primary database to the secondary database, the secondary database publishes data to the distributor for forwarding to the listeners of the availability group.

9. The one or more non-transitory computer-readable media of claim 8, further comprising:
   determining a problem with the primary database; and
   performing the failover from the primary database to the secondary database.

10. The one or more non-transitory computer-readable media of claim 8, wherein, after performing the failover, the secondary database publishes the data to the distributor for forwarding to the one or more network elements based on the one or more subscriptions.

11. The one or more non-transitory computer-readable media of claim 8, wherein the primary database is used to store data associated with staging an electronic commerce (ecommerce) website to receive orders placed by consumers.

12. The one or more non-transitory computer-readable media of claim 8, wherein the primary database is used to store data associated with staging an electronic commerce (ecommerce) website to receive orders placed by enterprise customers.

13. The one or more non-transitory computer-readable media of claim 11, further comprising:
   receiving, by the distributor, additional data via a messaging queue; and
   distributing, by the distributor, the additional data to the one or more network elements based on the one or more subscriptions.

14. A server comprising:
   one or more processors; and
   one or more non-transitory computer-readable media storing instructions that are executable by the one or more processors to perform operations comprising:
      configuring an availability group that includes metadata identifying a primary database and a secondary database of the availability group;
      configuring one or more subscriptions associated with the primary database, each subscription of the one or more subscriptions identifying a network element of one or more network elements that subscribes to a portion of data stored in the primary database; configuring the secondary database to replicate a content of the primary database; and
      configuring, based on the one or more subscriptions, the one or more network elements as listeners to the availability group including modifying each subscription of the one or more subscriptions to include information associated with the availability group rather than the primary database, wherein in response to a failover from the primary database to the secondary database, the secondary database publishes data to the listeners of the availability group.

15. The server of claim 14, the operations further comprising:
   detecting a problem associated with the primary database; and
   performing the failover from the primary database to the secondary database.

16. The server of claim 14, wherein, after performing the failover, the secondary database publishes the data, based on the one or more subscriptions, to the one or more network elements that were, prior to the failover, receiving the data from the primary database.

17. The server of claim 14, the operations further comprising:
   verifying that, in response to the failover from the primary database to the secondary database, the secondary database publishes the data based on the one or more subscriptions to one or more network elements that were, prior to the failover, receiving the data from the primary database.

18. The server of claim 14, the operations further comprising:
   determining that the failover from the primary database to the secondary database occurred; and maintaining an atomicity, consistency, isolation, durability of the data being sent to the listeners to the availability group.

19. The server of claim 14, wherein the secondary database is configured as a listener to the primary database.

20. The server of claim 14, wherein:
the data is sent from the availability group to a distributor; and
the distributor forwards the data, based on the one or more subscriptions, to the network elements.

* * * * *